United States Patent [19]

Waters

[11] Patent Number: 5,349,327
[45] Date of Patent: Sep. 20, 1994

[54] MONITOR APPARATUS FOR A BED UNDERLYING WATER

[75] Inventor: Colin B. Waters, Reading, England

[73] Assignee: Hydraulics Research Limited, Oxfordshire, England

[21] Appl. No.: 703,085

[22] Filed: May 20, 1991

[30] Foreign Application Priority Data

May 30, 1990 [GB] United Kingdom ............... 9012070

[51] Int. Cl.$^5$ .................. G08B 21/00; H01H 35/02
[52] U.S. Cl. .................. 340/540; 200/61.47; 324/71.2
[58] Field of Search ......... 340/540, 689, 815.03, 340/691, 606, 610, 611, 612, 615, 617; 200/61.47, 61.2, 61.21; 73/861.71; 861.74; 405/15, 303; 116/264, 273, 112; 324/71.2

[56] References Cited

U.S. PATENT DOCUMENTS

| 2,240,880 | 5/1941 | Bennett | 200/84 B |
|---|---|---|---|
| 2,704,046 | 3/1955 | Moraga | 116/264 X |
| 3,545,272 | 12/1970 | McGill | 73/311 |
| 3,550,447 | 12/1970 | Beresic | 200/61.21 X |
| 3,697,708 | 10/1972 | Beresic | 200/61.21 |
| 3,933,041 | 1/1976 | Hyer | 200/61.21 X |
| 3,962,693 | 6/1976 | Schambun | 390/565 |
| 4,139,750 | 2/1979 | Rau | 200/84 R |
| 4,642,557 | 2/1987 | Ross | 324/71.2 |

FOREIGN PATENT DOCUMENTS

| 2565351 | 12/1985 | France | 73/861.74 |
|---|---|---|---|
| 0024502 | 3/1981 | Japan | 324/71.2 |
| 1167245 | 7/1985 | U.S.S.R. | 405/15 |
| 1290029 | 2/1987 | U.S.S.R. | |
| 1149827 | 4/1969 | United Kingdom | |
| 1581291 | 10/1980 | United Kingdom | |

Primary Examiner—John K. Peng
Assistant Examiner—Thomas J. Mullen, Jr.
Attorney, Agent, or Firm—M. Lukacher

[57] ABSTRACT

A sensor is located in a bed underlying water. A downward array of sensors may be buried in the bed during normal flow conditions so as to be in a disabled mode. The sensor has an oscillatable arm (21) having a first end portion (22) for supporting the arm, and a second end portion (23) housing a sensor cell (25) e.g. an omnidirectional mercury switch. The alarm signal may be indicative of risk of collapse of a hydraulic structure, e.g. the foundation of a bridge pier.

8 Claims, 3 Drawing Sheets

MONITOR APPARATUS FOR A BED UNDERLYING WATER

BACKGROUND

Structures (e.g. river bridges) may be in and/or on beds underlying flowing water. Some examples of flowing water are flood flows and/or tidal flows, for instance water flowing in bays, estuaries, inlets, locks, rivers, seas, straits, sounds or weirs. Stability of a structure (e.g. a bridge), is threatened when flow of water scours or otherwise erodes the bed in the neighbourhood of the bridge's substructure, e.g. at a bridge's pier. The erosion may lead to collapse of a bridge, etc.

Inspections of e.g. bridges may be made by divers during low flow conditions of rivers. But, inspection of a bridge at a threatening times of flood may amount only to cursory visual examination of the bridge's superstructure, i.e. at location(s) above the surface of a river. Thus, it is possible not to detect erosion of a river bed in the neighbourhood of a bridge or other structure, during times of expected flooding or other turbulent conditions. Monitoring of e.g. a bridge during those times may be obscured by air entrainment, debris, sediment load, etc. comprised by a river.

SUMMARY OF THE INVENTION

It has now been found in accordance with the present invention that change in state of a bed, or threat to the state of said bed, underlying flowing water may be detected during threatening time (or other times) of flood flow or other flow of the water. Monitoring the state of the bed before, during, or after flood events may provide valuable information that would assist engineering assessment or other monitoring of the site of a said structure. The present invention may be utilised at any suitable distance(s) and/or depth(s) from the structure, e.g. a railway bridge over a river or other flowing water.

A first aspect of the invention provides monitor apparatus for detecting change in state of a bed, or threat to the state of said bed, underlying water during flow of the water, the apparatus comprising: at least one sensor for being arranged in and/or on the bed, optionally relative to a said structure, such that during sufficient flow (e.g. flood and/or tidal flow) of water at least one sensor will provide at least one alarm signal, this providing optionally occuring when sufficient scouring of the bed occurs relative to the at least one sensor.

A second aspect of the invention provides a method of monitoring change in state of a bed, or threat to the state of said bed, underlying water during flow of the water, the method comprising: utilising at least one monitor apparatus of the first aspect of the invention so as to provide at least one alarm signal, optionally when sufficient scouring of the bed occurs relative to the least one said sensor.

A third aspect of the invention provides a sensor adapted for use as a sensor according to the first or second aspect of the invention, preferably an oscillatable sensor as mentioned later below.

A fourth aspect of the invention provides a method of monitoring risk of collapse of a structure in and/or on a bed underlying water, the risk at least partly arising from change in state of said bed or from threat to the state of said bed, during flow of the water, said method comprising monitoring said bed in accordance with a monitoring method according to the first or second aspect of the invention, and preferably utilising at least one sensor according to the third aspect of the invention.

Any said structure of the fourth aspect of the invention may be termed a "hydraulic structure", the word "hydraulic" being used to mean any suitable structure in and/or on said bed underlying water. A said structure may be artificial (e.g. at least partly man and/or machine made), for instance a bridge, dam, lock, wall, or weir. A said structure may be natural, e.g. a natural bank or cliff.

Any said sensor may be suitably covered in and/or on the bed (preferably buried in the bed) so as to be protected during normal flow conditions, and thereby not provide any alarm signal, i.e. be in a disabled mode. If desired, relative to the general direction of normal flow of water: at least one plurality of sensors may be laterally disposed to the general direction of normal flow; and/or at least one plurality of sensors may be disposed in a downstream direction relative to the general direction of normal flow; and/or at least one plurality of sensors may be disposed in an upstream direction relative to the general direction of normal flow; and/or at least one plurality of sensors may be depth disposed relative to the general direction of normal flow. Separation(s) of sensors may be tailored to requirements of a structure, e.g. a particular bridge. Any plurality of sensors may be any suitable even or odd number of sensors. Two or more pluralities of sensors may have different or the same numbers of sensors. Sensor(s) may be disposed to sense scour and/or other erosion of the bed, e.g. relative to any artifical and/or natural structure in and/or on the bed.

Any suitable kind of sensor may be used. Some sensors may respond to e.g.: accelerations or velocities in flows of water; electrical conductivities of water; pressures exerted by flows of water; temperatures of water; turbidities of water; or viscosities of water. A preferred sensor is an oscillatable sensor adapted to oscillate during sufficient flow of water (e.g. flow resulting from formation of a scour hole in the bed) so that the sensor will be enabled to provide at least one alarm signal. Preferably, an oscillatable sensor comprises an oscillatable arm having first and second opposite end portions, the first end portion being adapted to support the arm, e.g. allow connection of the arm to a cable conduit through which at least one cable may pass to enter the arm and connect with at least one sensor comprised by the second end portion. Preferably, before an oscillatable sensor is activated, it is buried in the bed or otherwise covered. Any sensor may remain in an alarm mode after the sensor has been activated to provide at least one switch that will be activated to provide at least one alarm signal when suitable current passes through or ceases to pass through the at least switch. A switch may be embodied in any suitable manner. One example of a preferred sensor cell is an omni-directional mercury tilt switch available from R.S. Components Ltd., PO Box 99, Corby, Northants. NN179 RS England under the stock number 337-289.

Apparatus of the first aspect of the invention may comprise at least one source of electricity, and/or be adapted to be connected to at least one source of electricity, e.g. provided by a portable alarm indicator carried by a bridge inspector.

Apparatus of the first aspect of the invention may comprise circuitry comprising at least one component, e.g. a said source of electricity. The circuitry may comprise a plurality of electrical channels (e.g. passing in a cable conduit) corresponding to respective sensors of any said plurality of sensors, such that the state of any such sensor may be detected by sampling the corresponding channel. If desired, each channel may have a respective output terminal to which may be connected a portable alarm indicator by a bridge inspector. A plurality of output terminals [e.g. coupled to light emitting display(s)] may be housed in a suitable connector or housing above the surface of the water, e.g. on a bridge or on land. The circuitry may be adapted to transmit alarm signals to a remote location, e.g. a control room where, if desired, at least one alarm signal may be processed (e.g. logged), for instance automatically and/or manually to provide useful information, e.g. a display of the profile of a site erosion. In general, any alarm signal may be utilised in any suitable manner(s). The circuitry may comprise at least one processor means for processing at least one said alarm signal. The circuitry may comprise logging means for logging at least one alarm signal.

BRIEF DESCRIPTION OF DRAWINGS

In the accompanying drawings, which are by way of example of the present invention.

DETAILED DESCRIPTION

Figure 1:
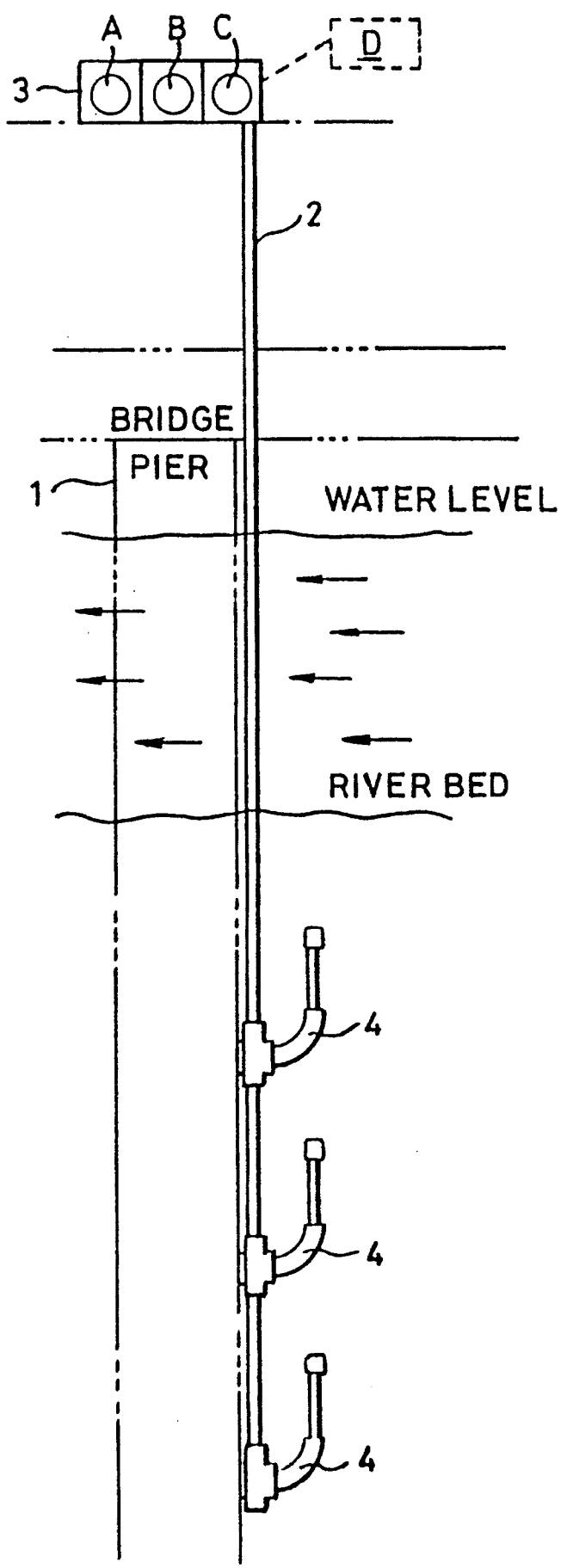
FIG. 1 schematically shows one embodiment of monitor apparatus disposed relative to the pier of a bridge (e.g. a railway bridge), the apparatus being in a disabled mode not providing any alarm signal.

In FIG. 1, a river bridge pier 1 has fixed to its upstream face a cable conduit 2 descending from a monitor box 3 (on the bridge or on a river bank) to below the river bed. A downward array of three oscillatable sensors 4 project laterally and upwardly from conduit 2. The sensors 4 are buried in the river bed, so as to be protected during normal flow conditions, and thereby be in a disabled mode not providing any alarm signal detectable at monitor box 3, which has three terminals A,B,C, corresponding to three cables 26 (FIG. 3) within conduit 2. These cables communicate with corresponding ones of the sensors 4. Conduit 2 protects the cables, and may be in the form of any suitable material(s), e.g. steel.

Figure 2:
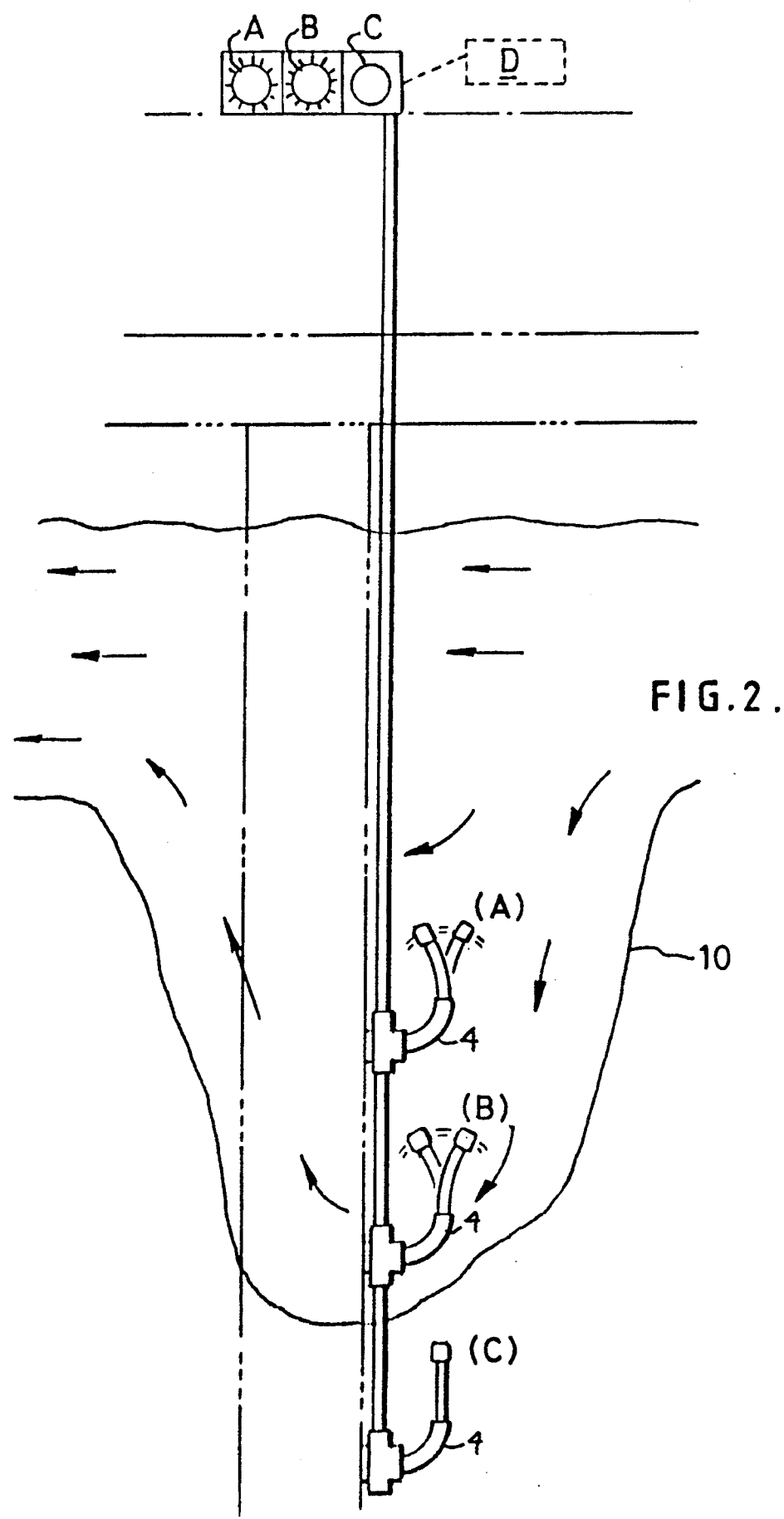
FIG. 2 shows FIG. 1's monitor apparatus after being put into an alarm mode in response to formation of a scour hole.

FIG. 2 corresponds to FIG. 1 when high flow (e.g. flood and/or tidal flow) of the river has scoured a hole 10 in the river bed so as to reveal the upper two sensors 4, which thereby oscillate and enable corresponding alarm signals to be available at respective terminals A,B,C, (each comprising a respective light emitting diodes display) of monitor box 3, which has terminals A,B,C. The terminals may be sampled by a portable alarm indicator or other means carried by a bridge inspector. As shown in FIG. 2, the oscillation of the sensors includes side-to-side displacements which resolve into motion upwardly towards the surface of the water, after downward motion away from the water surface. The sampling may be carried out in any other suitable manner, e.g. by a remote system. Terminals A and B are shown activated by corresponding sensors (A) and (B). Terminals A,B,C are shown coupled to an optional logger D for logging alarm signal(s), e.g. an optical logger and/or other logger.

Figure 3:
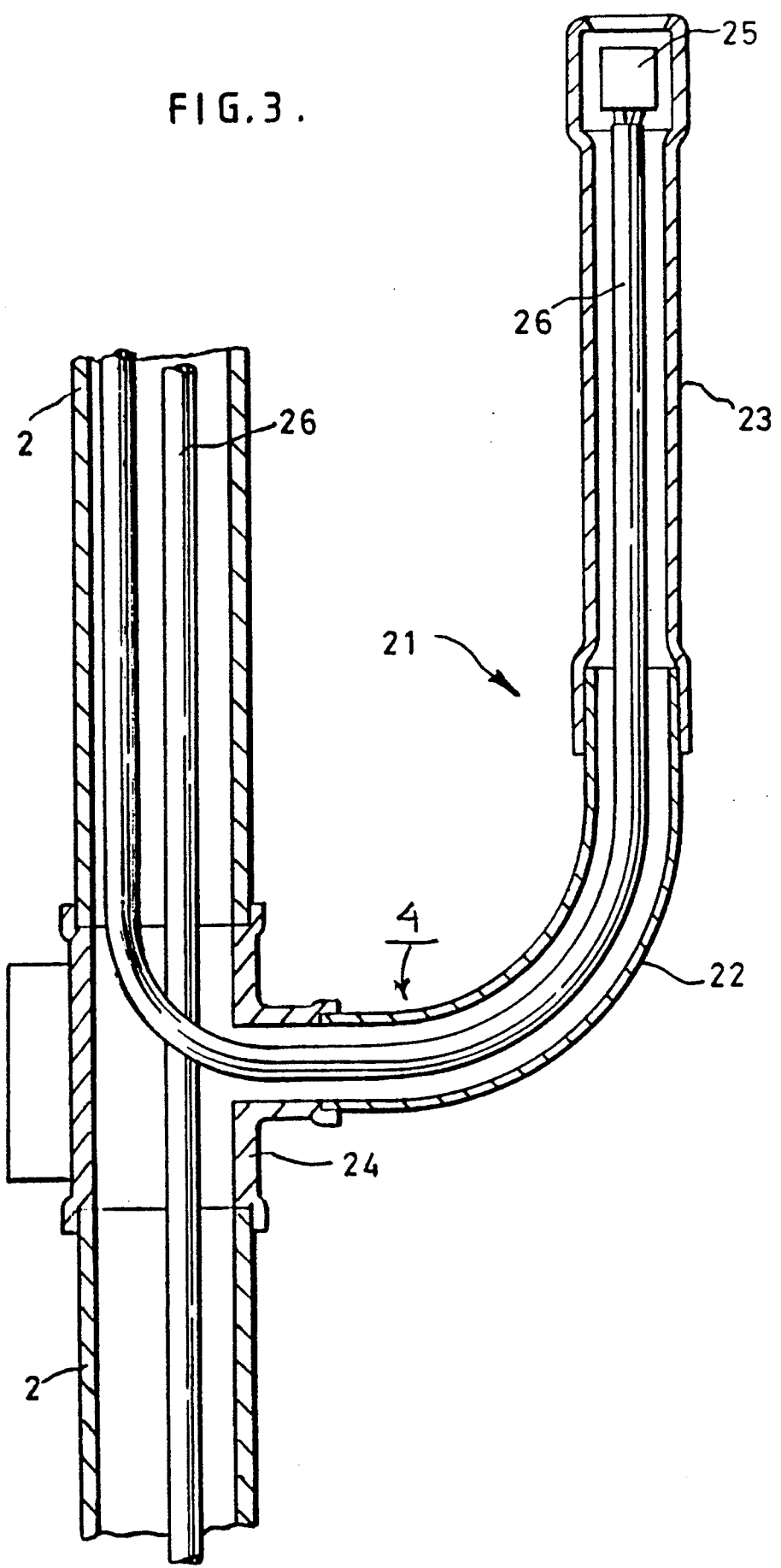
FIG. 3 shows one embodiment of an oscillatable sensor for being utilised in an array of sensors shown in FIGS. 1 and 2.

FIG. 3 shows one example of an oscillatable sensor 4, which has an oscillatable arm 21 having a first end portion 22 that is rigid (e.g. a steel sleeve with a paint or other polymeric coating), and an opposite second end portion 23 that is flexible (e.g. a rubber or other polymeric sleeve). First end portion 22 couples to conduit 2 via a tee coupling 24. Second end portion 23 includes a sensor cell 25 that has an omni-directional mercury tilt switch available from RS Components Ltd as mentioned above. Cable 26 provides communication between sensor cell 25 and a corresponding terminal of monitor box 3, via the interior of conduit 2.

Monitor apparatus, and any components thereof, shown in the accompanying drawings can be modified according to the description given above the first reference to the drawings. In general, the present invention includes equivalents and modifications arising from all the disclosures of the present application. For example, any suitable number of oscillatable sensors 4 and any suitable number of terminals A,B,C, etc. may be used.

I claim:

1. Monitor apparatus for a bed underlying water comprising one or more electrical sensors each assuming an enabled or a disabled mode of operation, depending upon the status of at least one physical condition of said bed, such that sufficient flow of water over said bed to induce scouring thereof will cause at least one of said one or more sensors to be in the enabled mode and to output an alarm signal in response to corresponding erosion of said bed, said one or more sensors being adapted to be in the disabled mode during normal flow conditions corresponding to insufficient flow of water over said bed to induce scouring thereof, circuitry means connected to said one or more sensors for receiving said alarm signal, and a support structure for said one or more sensors, and wherein said one or more sensors each comprise an arm oscillated by the flow of said water and having first and second end portions, each arm being supported at its first end portion by the support structure and the second end portion of each arm comprising at least one sensor cell.

2. Monitor apparatus claimed in claim 1, wherein said at least one sensor cell comprises at least one omnidirectional tilt switch.

3. Monitor apparatus claimed in claim 2, wherein said at least one switch is an omni-directional mercury tilt switch.

4. The monitor apparatus as claimed in claim 1 wherein said first end portion of said arm extends in a generally horizontal direction, and said second end portion of said arm extends in a generally vertical direction and supports said at least one sensor cell.

5. Monitor apparatus as claimed in claim 1, wherein said circuitry means connected to said one or more sensors comprises at least one output terminal from each of said one or more sensors, said at least one output terminal from each of said one or more sensors and a portable alarm indicator being in signal communicating relationship with each other.

6. A method of monitoring and determining when risk of collapse of a hydraulic structure exists with the aid of a sensor which comprises the steps of mounting the sensor in a body having an end pointing upwardly when the body is in water toward the surface of the water, arranging said sensor and body in a bed underlying water so that when the bed is scoured, the body becomes exposed to water and thereby oscillates whereby corresponding oscillations of said sensor occur and responding to the oscillations of said sensor so as to provide at least one alarm signal indicative of existence of said risk.

7. A sensor arrangement for monitoring the condition of a bed underlying water comprising an arm oscillated by the flow of water and having first and second end portions, the arm being supported at its first end portion, and the second end portion comprising at least one sensor cell, said at least one sensor cell comprising at least one omni-directional switch.

8. A sensor arrangement as claimed in claim 7 wherein said at least one switch is an omni-directional mercury tilt switch.

* * * * *